United States Patent [19]

Wiedemann

[11] Patent Number: 5,501,790
[45] Date of Patent: Mar. 26, 1996

[54] AQUARIUM FILTER

[75] Inventor: Robert I. J. Wiedemann, Shepperton, United Kingdom

[73] Assignee: Pet Mate Limited, Surrey, United Kingdom

[21] Appl. No.: 357,201

[22] Filed: Dec. 13, 1994

[30] Foreign Application Priority Data

Dec. 16, 1993 [GB] United Kingdom .................. 9325881

[51] Int. Cl.⁶ .............................. C02F 3/02; A01K 63/04
[52] U.S. Cl. .................. 210/86; 210/95; 210/109; 210/151; 210/169; 210/202; 210/203; 210/416.2
[58] Field of Search ...................... 210/169, 202, 210/203, 416.2, 86, 95, 109, 150, 151

[56] References Cited

U.S. PATENT DOCUMENTS

| | | | |
|---|---|---|---|
| 3,151,069 | 9/1964 | Halpert | 210/169 |
| 3,294,239 | 12/1966 | Dayes | 210/169 |
| 3,485,373 | 12/1969 | Powers | 210/169 |
| 3,771,544 | 11/1973 | Horvath | 210/169 |
| 4,220,530 | 9/1980 | Gabriele | 210/86 |
| 5,011,600 | 4/1991 | Mowka, Jr. et al. | 210/169 |
| 5,160,622 | 11/1992 | Gunderson et al. | 210/617 |
| 5,176,824 | 1/1993 | Willinger et al. | 210/169 |
| 5,336,401 | 9/1994 | Tu | 210/169 |

FOREIGN PATENT DOCUMENTS

| | | | |
|---|---|---|---|
| 2700030 | 7/1978 | Germany . | |
| 3238366 | 4/1984 | Germany . | |
| 3726442 | 4/1988 | Germany | 210/169 |
| 3805770 | 9/1989 | Germany | 210/169 |
| 2198051 | 6/1988 | United Kingdom | 210/169 |

*Primary Examiner*—Peter A. Hruskoci
*Assistant Examiner*—Theodore M. Green
*Attorney, Agent, or Firm*—Young & Thompson

[57] ABSTRACT

A filtration unit for an aquarium tank comprises a biological filter chamber which is cyclically exposed to air and water without the use of conventional syphon means. Alongside the chamber is a U-tube arrangement one branch of which communicates at its upper end with the upper region of the chamber. Compressed air is continuously admitted to the chamber, e.g. by bubbling up beneath its open bottom end. When the water in chamber drops to the level of the bend of the U-tube air in the chamber expells remaining water from the U-tube and is able to evacuate chamber, enabling it to refill with water.

18 Claims, 8 Drawing Sheets

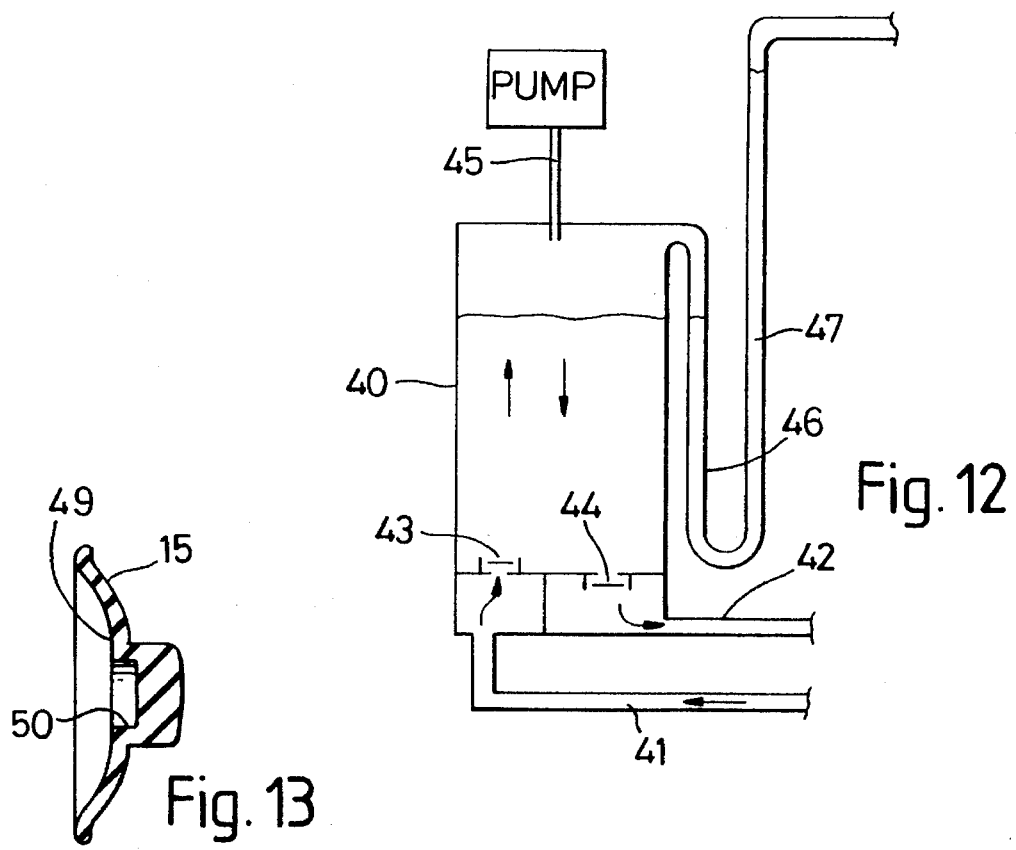
Fig. 12
Fig. 13
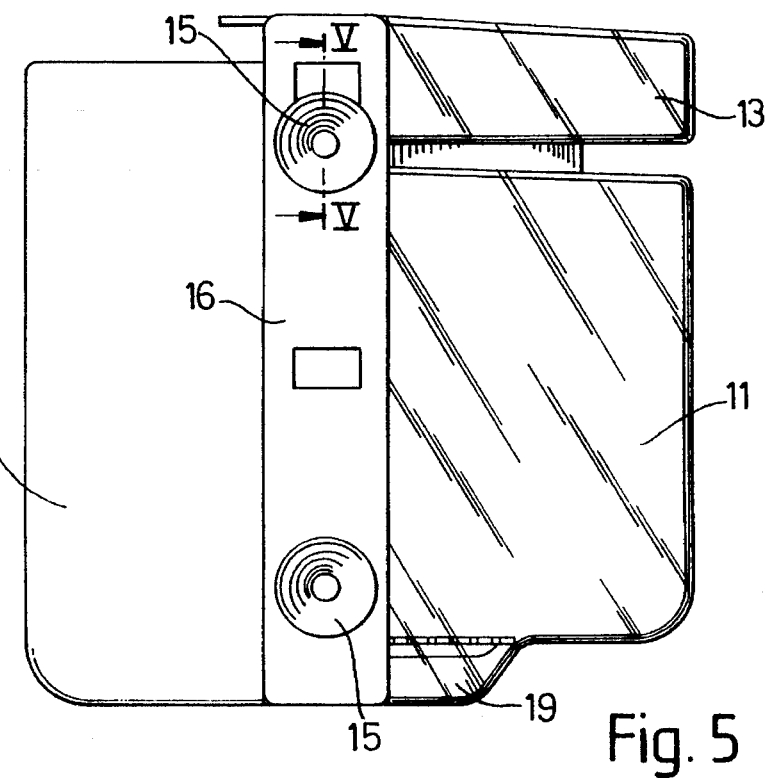
Fig. 5

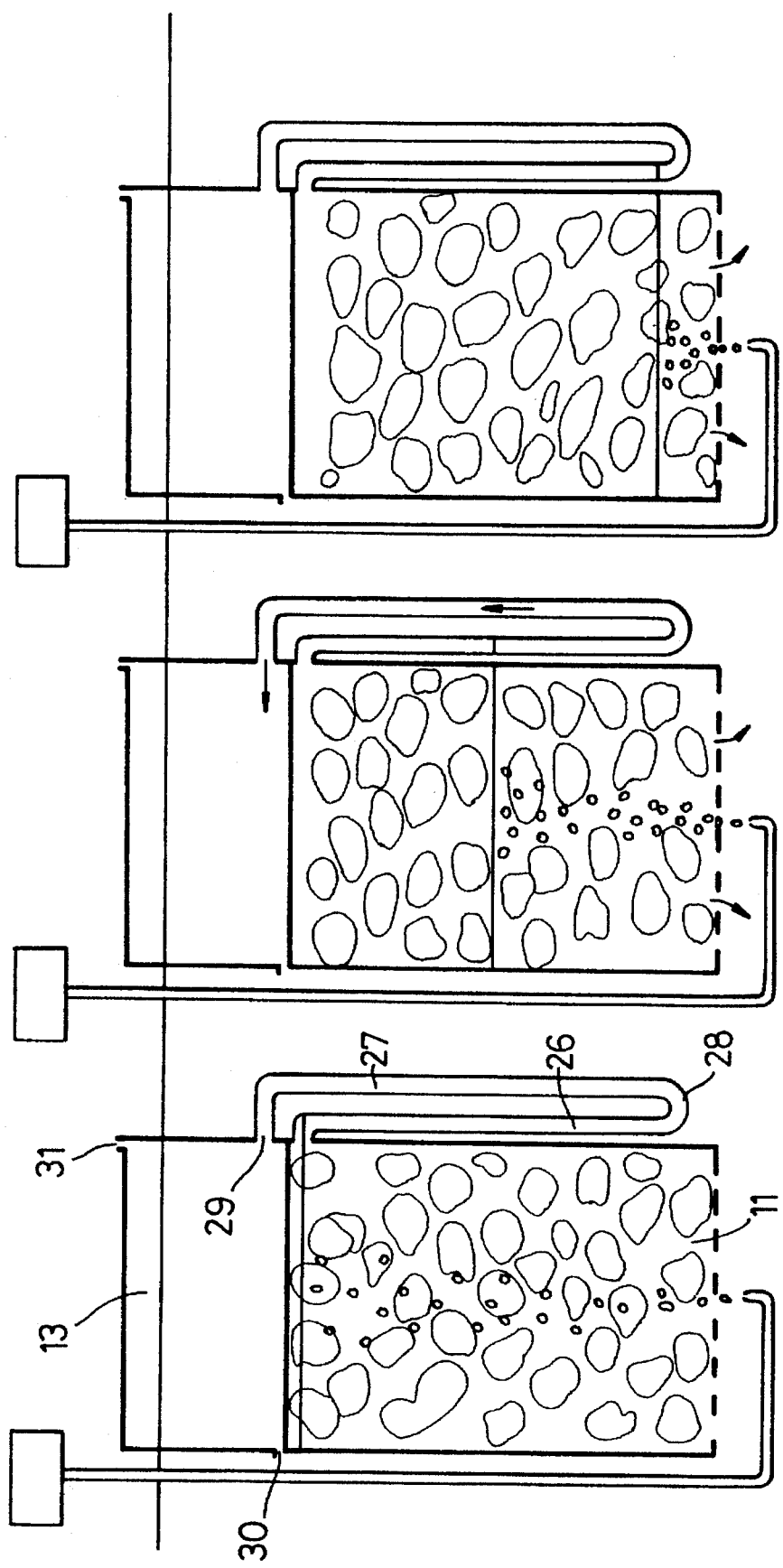

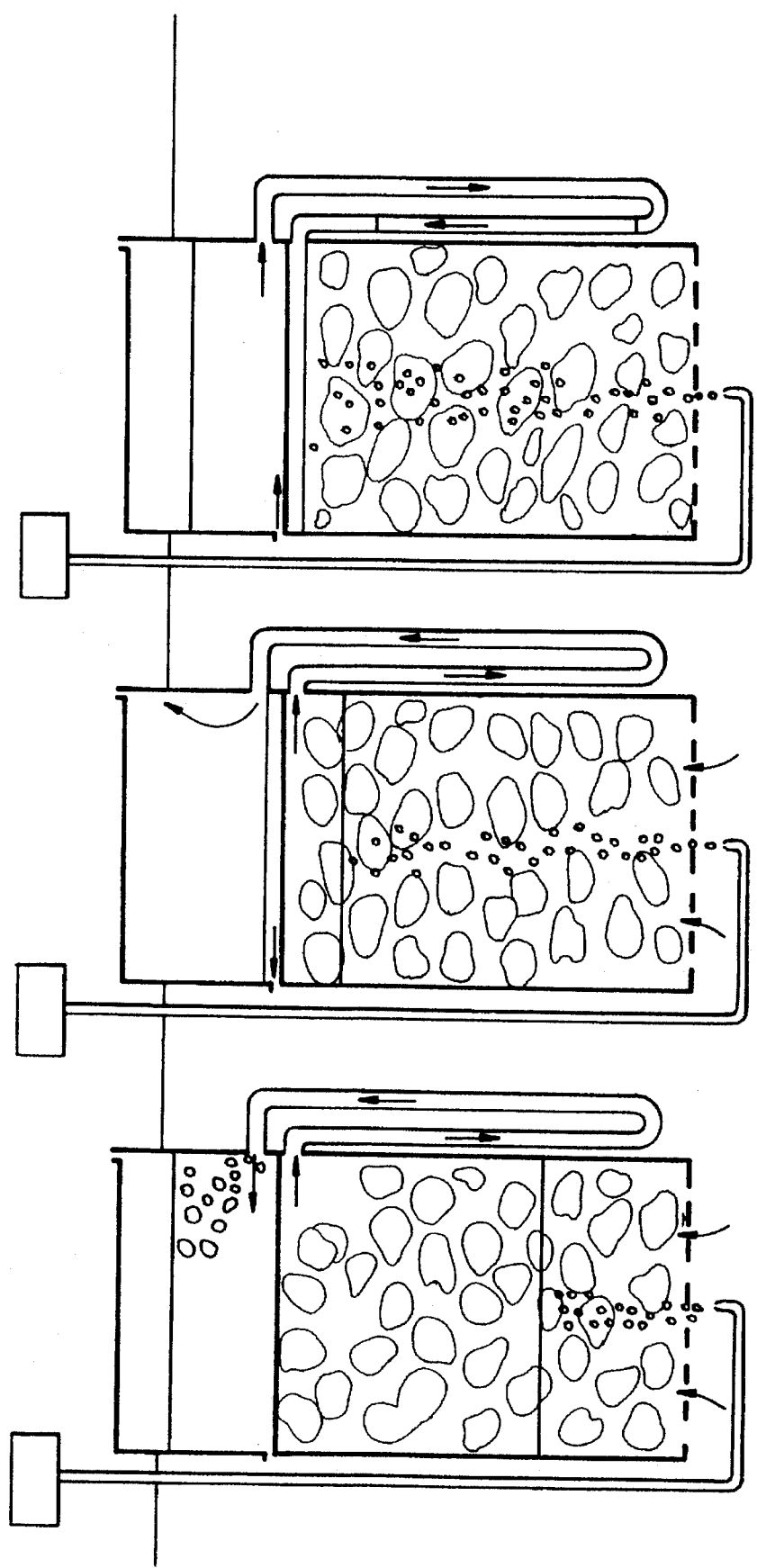

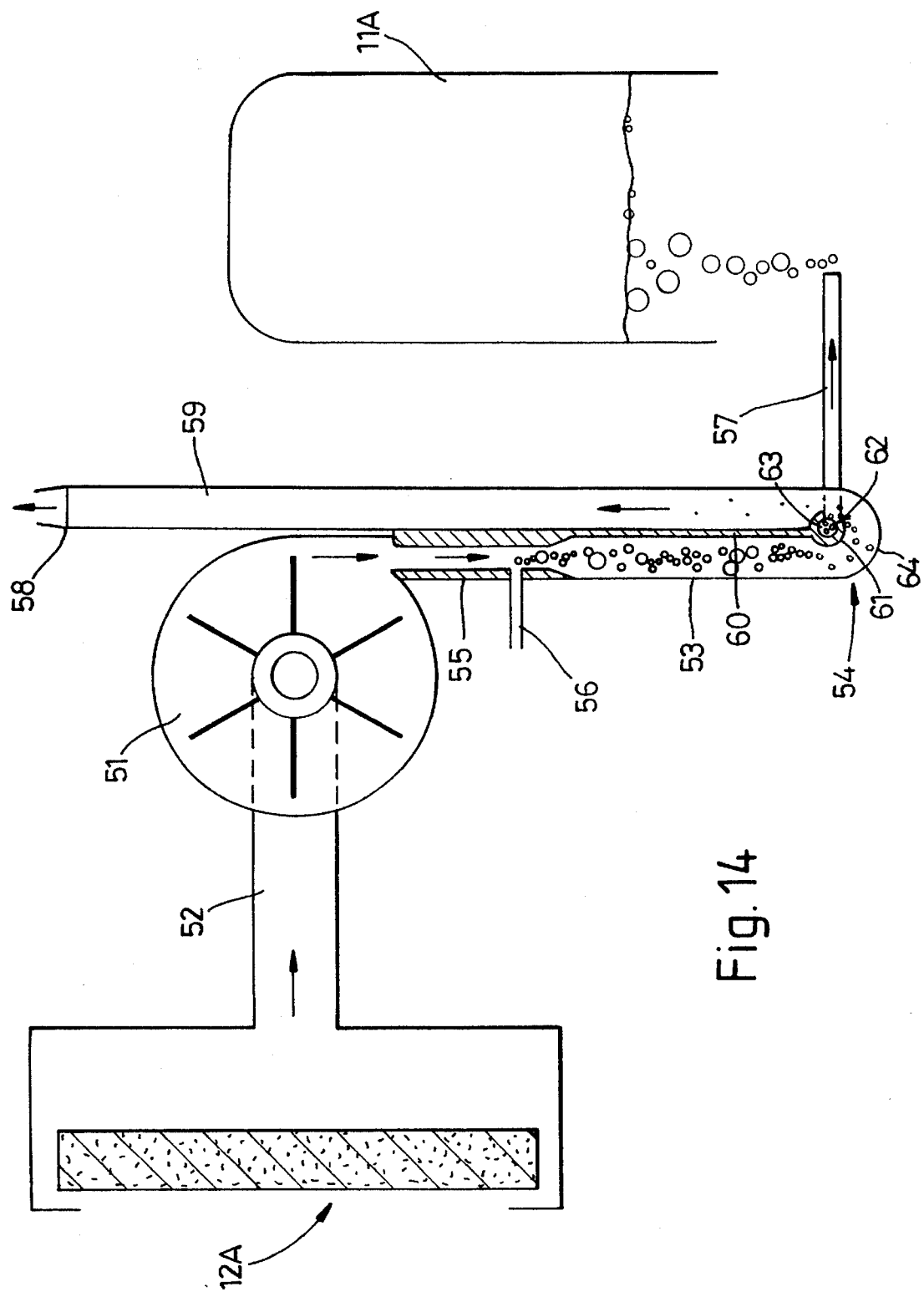

AQUARIUM FILTER

BACKGROUND OF THE INVENTION

1. Field of the Invention

This invention relates to an improved aquarium filter and more particularly to an improved biological filter for an aquarium and to a filtration unit which comprises said improved biological filter together with a mechanical filter.

2. Description of the Prior Art

It is well known that the water in an aquarium needs filtration both to maintain clarity and purity. In addition to a filter capable of removing solids from the water a biological filter is desirable to maintain its purity, the latter comprising a particulate material such as gravel or sand on which living bacteria can grow. It is also known that to promote the life cycle of the bacteria it is desirable that the biological filter medium should be intermittently exposed to air.

OBJECT OF THE INVENTION

An object of the present invention is to provide a simple, economical, reliable manner in which intermittent exposure of a biological filter medium to air can be achieved.

SUMMARY OF THE INVENTION

In accordance with one aspect of the present invention there is provided a biological filter for an aquarium comprising a biological filter chamber containing a biological filter medium, means for disposing the chamber in or alongside an aquarium tank so that the chamber is substantially below the water level of the tank, means for connecting the bottom region of the chamber to water in the tank, means for introducing air under pressure into the chamber, an outlet connection in the upper region of the chamber and U-tube means comprising two upright branches joined at their bottom ends at or above the level of the bottom of the chamber, one said branch communicating at its upper end with said outlet connection of the chamber and the upper end of the other branch being level with or above said outlet connection, the arrangement being such that in use of the filter air admitted to the chamber displaces water therein until the water level in the chamber reaches the bottom ends of the branches, whereupon residual water in the other branch is expelled to permit evacuation of air from the chamber through the U-tube means with consequent refilling of the chamber and of the branches of the U-tube means with water from the aquarium tank to recommence the cycle.

In a preferred construction the chamber is open at its bottom end and the air introduction means is an air outlet disposed below the chamber, the chamber is adapted for submersion in the water in an aquarium tank and the said air outlet is arranged also to provide an air lift in the region of the biological filter chamber. In this way the air supply traditionally used to oxygenate the water is also utilised to actuate the biological filter cycle.

The said air outlet may be in the form of a horizontally-elongated, hollow member having an array of perforations in its upper surface, and means may be provided to vary the position of the hollow member relative to the bottom of the chamber to adjust the ratio of air passing either to the chamber or to the air lift. The said hollow member may be mounted eccentrically on the bottom of an upwardly extending hollow shaft, the shaft serving to conduct compressed air to the hollow member and being rotatable to vary the position of the hollow member relative to the bottom of the biological filter chamber.

The filter of the three immediately preceding paragraphs may additionally comprise a mechanical filter arranged so that the air lift will draw aquarium tank water through it on its way to the biological filter chamber. The mechanical filter may comprise a chamber filled with a mechanical filter medium, having openings to admit aquarium tank water in at least one vertical face and communicating at its bottom end with the air lift.

By such an arrangement all of the necessary oxygenation and filtration functions can be carried out by a single, compact unit which can be located e.g. on an inner wall of an aquarium tank where it will not disturb fish or plants in the tank. By use of such a unit the need for under-gravel filtration is eliminated so that the tank does not need to be periodically stripped with consequent disturbance to the life within the tank. The function of the air lift in oxygenating the water is greatly augmented by the wet/dry cycle of the immersed biological filter as large surface areas of water are brought into contact with clean air.

In accordance with another feature of the present invention the filtration unit may comprise a condition monitor for the mechanical filter in the form of an upright channel which tapers upwardly, the upper end region of the channel having an opening direct to the aquarium water (i.e. which by-passes the mechanical filter medium) and the channel communicating at its bottom end with the air lift via a lower compartment of the filter which is also in communication with the bottom of the air lift and the bottom of the biological filter chamber, the monitor additionally comprising a buoyant element freely located in the channel and of smaller dimensions than at least the wider part of the channel, the arrangement being such that in use as the mechanical filter medium becomes blocked the flow of aquarium water through the channel will increase, thereby driving the buoyant element downward in the channel to provide a visible indication of the condition of the mechanical filter medium.

In such an arrangement as the biological filter cycles, more particularly as the biological filter chamber rapidly refills with water, the flow of water through the condition monitor will momentarily increase causing an intermittent dipping motion of the buoyant element. This results in "scrubbing" the channel in which the buoyant element runs, this reducing the the need for cleaning of the condition monitor.

In a preferred construction the filtration unit further comprises a silencer chamber located above the biological filter chamber, the silencer chamber communicating with the upper end of the other branch of the U-tube means and having one or more restricted openings at positions which in use will be below the water level of the aquarium tank and having an air outlet in its upper region which in use will be above the water level of the aquarium tank, the arrangement being such that in use of the filter air evacuating the biological filter chamber will displace water from the silencer chamber, thereby reducing the flow rate of air escaping from the silencer chamber to atmosphere.

The purpose of the silencer is to prevent any whistling or other noise as compressed air rapidly escapes from the biological filter chamber. The water in the silencer chamber acts as an hydraulic damper absorbing some of the energy of the escaping air. As the water level in the silencer chamber is restored the remainder of the excess air escapes at a relatively low velocity.

The said means for disposing the biological filter chamber in an aquarium tank preferably comprises one or more suction cups, the or each said cup having in its concave face a central recess for the reception of an adhesive such as a silicon adhesive. If conventional resilient suction cups are used to mount the filtration unit of the invention on the inner surface of a glass wall of an aquarium tank in a submerged position there is a tendency for them to slide along the glass, and this tendency is encouraged by the cycling action of the filter so that the unit may tend gradually to move downward in the tank. The use of adhesives with conventional suction cups is not wholly successful. It has been found that if a suction cup is given, in its concave face, a small central recess and if a small blob of the adhesive is put in this recess before pressing the suction cup against the glass the suction cup will become effectively bonded to the glass and will not tend to slide. With the filtration unit of the invention it is particularly useful that its "anchorage" on the tank wall should have a permanent, fixed position because this enables the unit to be removed e.g. from a bracket supported by a plurality of the suction cups for cleaning and maintenance and then put back on the bracket without having to re-select the optimum position of the unit relative to the water level in the tank.

In an alternative embodiment of the present invention the biological filter chamber can be adapted for location outside the aquarium tank. In this case it will have water inlet and outlet means in its lower region adapted for connection to water in the tank at spaced-apart positions, the water inlet and outlet means being controlled by respective one-way valves to ensure that water flowing into the biological filter chamber as air evacuates therefrom is not substantially the same water as was expelled from the biological filter chamber during the previous cycle.

In yet another embodiment of the invention the filter comprises a plurality of biological filter chambers each having an associated U-tube means and arranged so that the source of compressed air for a second said chamber is the air intermittently evacuated from a first said chamber. Chambers arranged thus "in series" require only a single source of compressed air delivering to a first of them.

A filtration unit incorporating the biological filter of the present invention may also comprise a mechanical filter having associated therewith a water pump arranged to displace aquarium water through the mechanical filter, the pump having on its downstream side an outlet passage in which a Venturi is formed, an air inlet opening to said outlet passage in the region of the Venturi whereby air is entrained in water flowing in said passage, the arrangement being such that said entrained air is utilised as said means for introducing air under pressure into the biological filter chamber.

The said outlet passage of the water pump may be one branch of an upright U-tube arrangement having on the inside of the bend therein an opening at one end of an air outlet, the arrangement being such that the mixture of water and air will separate at said bend and substantially only air will be exposed to said opening.

The other branch of said upright U-tube arrangement may be provided with a restriction such as to produce back-pressure in the U-tube which will expel air through the air outlet. The other end of the air outlet may open to a position beneath an open, bottom end of the biological filter chamber.

DESCRIPTION OF THE DRAWINGS

Preferred embodiments of the present invention will now be described by way of non-limitative example with reference to the accompanying drawings, in which:

FIG. 5 is a rear view of the unit on a reduced scale,

FIGS. 6–11 are schematic illustrations of the cycle of the biological filter of the unit of FIGS. 1–5, FIG. 12 is a schematic illustration of another embodiment of the invention in which a biological filter chamber is adapted to be disposed outside an aquarium tank, FIG. 13 is a cross-sectional view on an enlarged scale of one of the suction cups 15 of the unit of FIGS. 1–5 taken on the line V—V of FIG. 5, and FIG. 14 schematically illustrates an alternative arrangement in which air for cycling the biological filter is provided by a water pump associated with the mechanical filter.

DESCRIPTION OF THE PREFERRED EMBODIMENT

Figure 1:
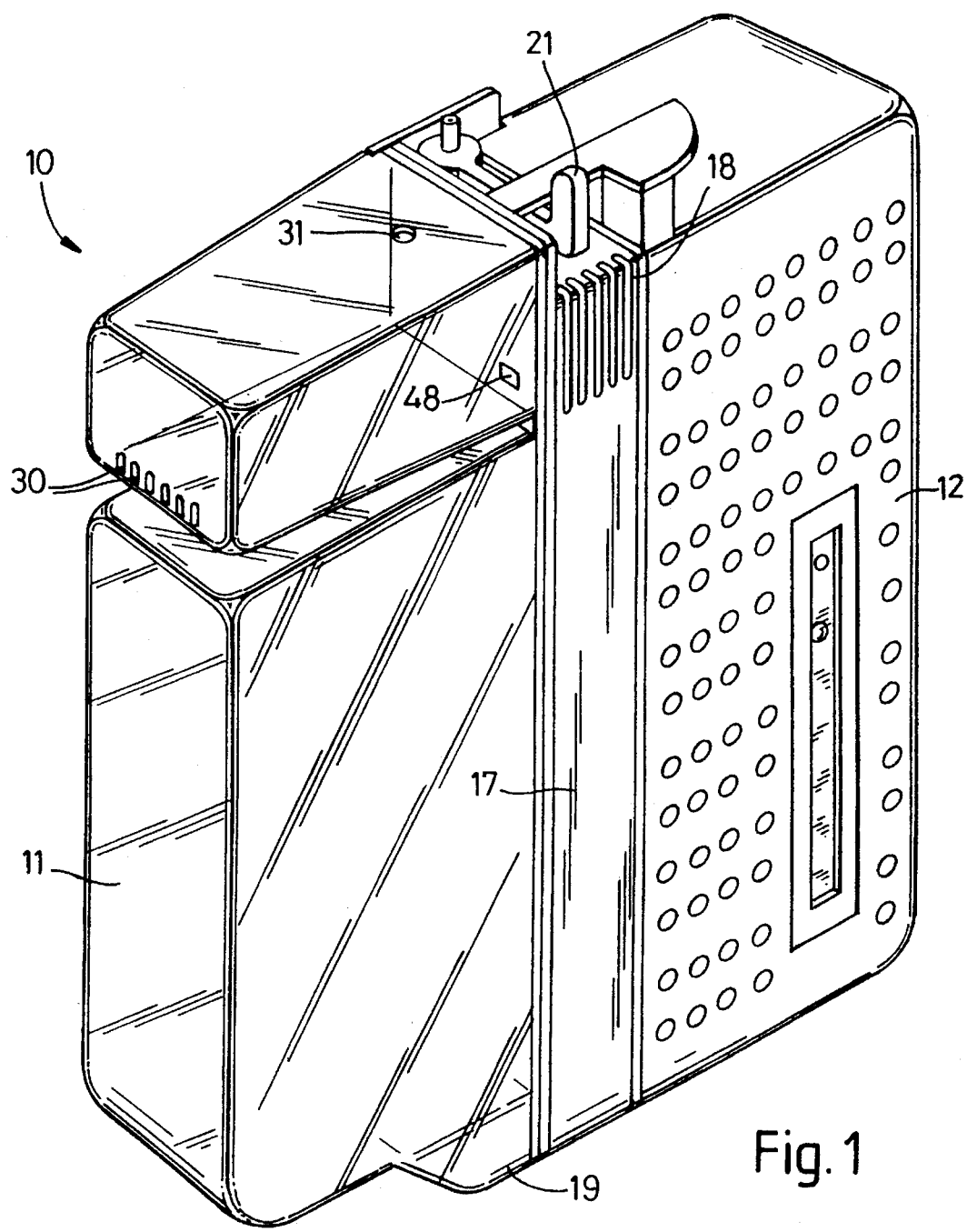
FIG. 1 is a perspective view of a filtration unit in accordance with a first embodiment of the present invention.
Figure 2:
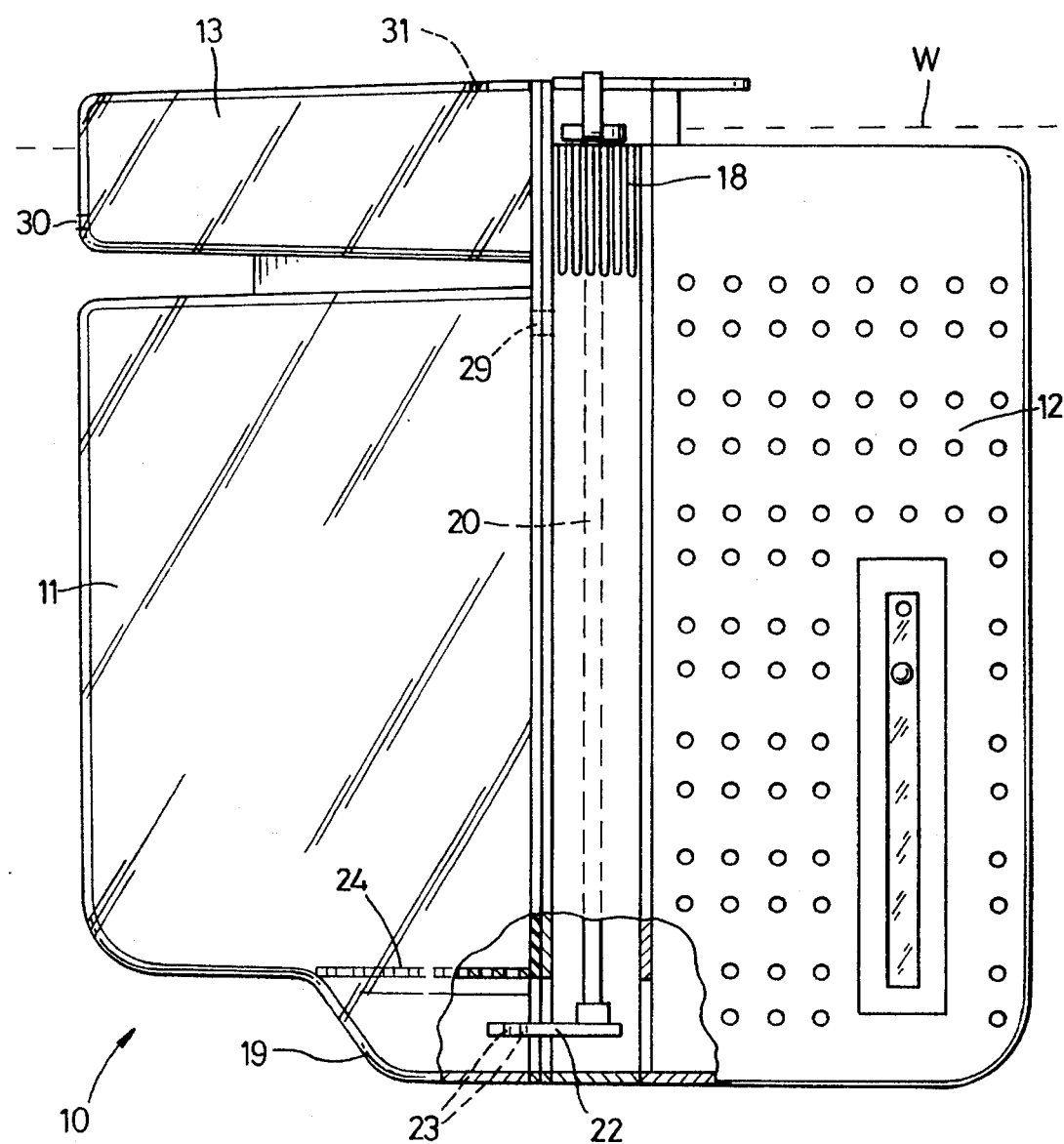
FIG. 2 is a side elevation of the unit of FIG. 1, partly broken away.
Figure 3:
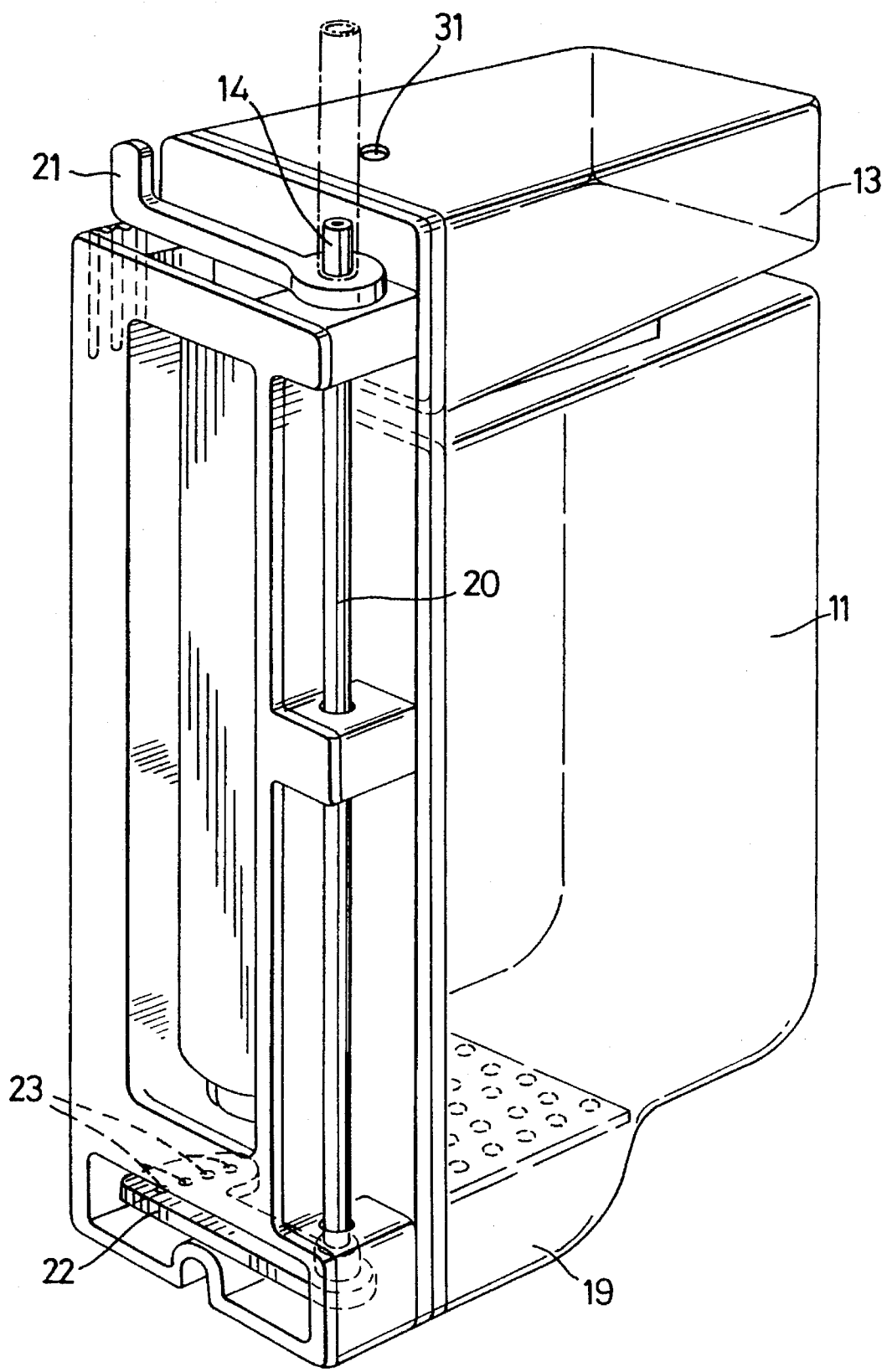
FIG. 3 is a perspective view of the unit with the mechanical filter chamber removed.

The filtration and aeration unit 10 illustrated in full in FIGS. 1, 2 and 5 is adapted to be almost fully immersed in use in the water in an aquarium tank (not shown). The intended depth of immersion is indicated by the line "W" in FIG. 2 which represents the surface of the water in the tank. In this way a biological filter chamber 11 of the unit and a mechanical filter chamber 12 of the unit will be fully submerged but a silencer chamber 13 above the biological filter chamber will be only partly submerged and fittings such as a lever 21 at the top of the unit will be accessible without wetting the hands. The unit 10 can be mounted on an inner wall of an aquarium tank by means of suction cups 15 at the back of the unit. Preferably and as shown the cups 15 are mounted on a bracket 16 which is recessed into the back of the unit to provide minimum clearance between the latter and the tank wall so that even small fish cannot hide behind the unit. The bracket 16 preferably has hooks (not shown) which pass through apertures (not shown) in the back of the unit so that the unit is removable from the bracket. In this way the unit 10 can be removed from the tank for maintenance and cleaning without disturbing the positions of the suction cups 15.

As shown in FIG. 13, each of the suction cups 15 has at the centre of its concave face 49 a recess 50. This is adapted to receive a blob of a silicone adhesive which will bend the suction cup 15 to the glass of the tank wall. In use, therefore, the bracket 16 has a permanent position relative to the tank wall and does not have to be re-positioned when the unit is temporarily removed from the bracket e.g. for cleaning or maintenance. Due to the cycling of the biological filter the unit would otherwise have a particular tendency to cause the suction cups to slide on the glass, so that it would tend to move incrementally downward in the tank. The recessed suction cups combined with the use of an adhesive is found to be an optimum solution to this problem.

The biological filter chamber 11 and the mechanical filter chamber 12 are disposed on opposite sides of an air lift chamber 17 which extends from a lower compartment 19 at the bottom of unit 10 to apertures 18 at the top of the unit for the escape of air and water from the airlift chamber.

Compressed air for the airlift is introduced by a line (not shown) connected to a fitting 14, which is the top end of a hollow shaft 20. The shaft 20 can be rotated by lever 21 but is not axially movable. On the bottom end of the shaft 20 there is mounted a hollow air distribution element 22 roughly of L-shape, the interior of element 22 being in communication with the interior of shaft 20. The upper surface of the "foot" of the L has an array of openings 23 out of which air will bubble when compressed air is introduced through the fitting 14. The shape and disposition of the element 22 is such that at all times some air will bubble up into the chamber 11 even though most of the air may pass up the air lift chamber 17 to escape. By moving the lever 21 the proportion of the air which will enter the chamber 11 can be increased or reduced, thus varying the rate of cycle of the biological filter as will later be explained.

It will be understood that use of the hollow element 22 rotatable on the bottom of shaft 20 to vary the distribution of air between the biological filter chamber 11 and the air lift chamber 17 is purely optional. In an alterative arrangement (not shown) a movable vane is positioned above a fixed aim outlet to permit adjustment of the air flow to the two chambers.

The front face of the mechanical filter chamber 12 is perforated to admit water from the tank as suction is created by the operation of the air lift. Water from the tank thus flows through the mechanical filter chamber 12, for the separation of solids, into the lower compartment 19 and from thence into the bottom of the biological filter chamber 11. This is open except for the interposition of a perforated member 24 serving to prevent gravel or the like biological filter medium from falling out of the chamber 11.

Figure 4:
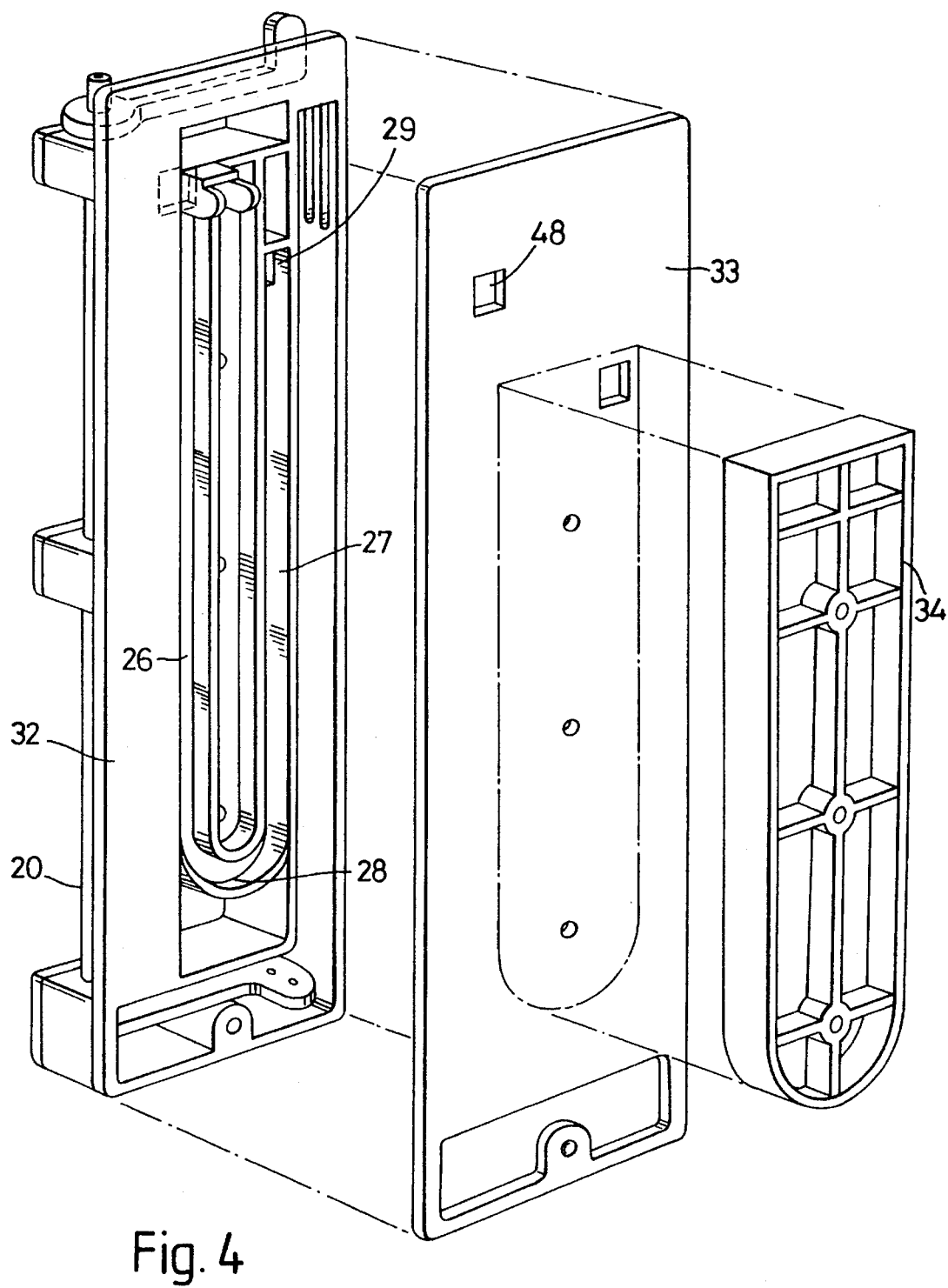
FIG. 4 is an exploded view of the components making up the U-tube associated with the biological filter chamber.

As most clearly seen in FIG. 4 there is associated with the biological filter chamber 11 a U-tube construction 25 comprising upright branches 26 and 27 connected at their lower ends by a web portion 28. The branch 26 communicates at its upper end through an aperture 29 with the upper region of the biological filter chamber 11. The upper end of the other branch 27 communicates at a higher level with the silencer chamber 13 through an opening 48. The silencer chamber 13 has submerged openings 30 at its front and an air escape opening 31 at its top.

The U-tube construction consists of a U-channel in the wall 32 partitioning the biological filter chamber 11 from the air lift chamber 17 over which a rubber gasket 33 is clamped by a fitting 34 when the latter is attached by screws (not shown) to the wall 32. The gasket 33 makes the U-tube air- and water-tight and the construction permits disassembly of the U-tube for inspection and cleaning.

The operational cycle of the biological filter chamber 11 will now be explained with reference to FIGS. 6–11. Components so far described are identified with like reference numerals although for purposes of clarity they are illustrated schematically.

At the commencement of the cycle (FIG. 6) it is assumed that there is no appreciable volume of air in the chamber 11. The chamber 11 is full of the aquarium water in which the unit is immersed and so is the U-tube 26,27. As air bubbles into the bottom of the chamber 11 (FIG. 7) it displaces water downward in the chamber 11 and simultaneously in the branch 26 of the U-tube. When the level of the water in the chamber 11 and in the branch 26 of the U-tube reaches the U-bend 28 (FIG. 8) the air in chamber 11 is able instantaneously to expel the residual water from the other branch 27 of the U-tube and to follow it into the silencer chamber 13 (FIG. 9). As the air escapes from the chamber 11 it refills with water (FIGS. 10 and 11) through its bottom. In a construction in which the U-tube has not already refilled with water this will occur as soon as the water level in chamber 11 reaches the connection 29 between the chamber and the branch 26 of the U-tube. However in the present construction this will already have occurred through the branch 27, which itself opens beneath the level of water in the tank.

The function of the silencer chamber 13 is to prevent so rapid an escape of air through the opening 31 as to cause noise. Water initially expelled from the branch 27 enters water already in the silencer chamber and an excess passes out through the openings 30. When the whole of the air in the chamber 11 passes rapidly into the silencer chamber 13 (FIG. 9) air pressure at the opening 31 will cause a fall in the water level in the silencer chamber (FIG. 10), water being expelled from the openings 30. Of course as soon as air pressure inside the silencer chamber 13 drops as air escapes through opening 31 (FIG. 11) the silencer chamber refills with water through openings 30 until it reaches the same level as the water in the tank, at the same time refilling the branch 27 of the U-tube.

It will be understood that whereas the escape of aim from chamber 11 is almost instantaneous, once the "inverted siphon" represented by the U-tube 26,27,28 is "broken" (FIG. 8) the displacement of water from the chamber 11 is progressive and the speed at which this occurs can be varied by varying the rate of flow of air into the chamber.

By this means the biological filter medium in chamber 11 is alternately submerged and exposed to clean, incoming air. The intermittent exposure of large surface areas to clean air also greatly promotes oxygenation of the water.

The embodiment of the invention illustrated in FIG. 12 demonstrates that it is inessential that the biological filter chamber should be submerged in the water in an aquarium tank, that it is inessential that air should be admitted through the bottom of the chamber and moreoever than it is inessential that the U-tube should open beneath the surface of water in the tank. In FIG. 12 the biological filter chamber 40 is located outside an aquarium tank (not shown) bat below the water level therein. Pipes 41 and 42 connect the bottom of the chamber to the tank at spaced apart positions to permit a through-flow of water and to prevent the same volume of tank water repeatedly entering and leaving the chamber 40. Flap valves 43 and 44 prevent reverse flow of water.

Compressed air is admitted from above into chamber 40 by an inlet 45. One branch 46 of a U-tube is connected as before to an upper region of chamber 40 bat the upper end of the other branch 47 passes upwardly to discharge water back into the tank via an outlet (not shown) above the water level of the tank. As in the previous embodiment, admitted compressed air displaces water out of the chamber 40 until its water level reaches the U-bend, whereupon it will expel water from the branch 47 enabling it instantaneously to evacuate the chamber 40 so that the cycle recommences.

In yet another embodiment of the invention which is not illustrated in the Drawings the upper end of the branch of the U-tube means remote from the biological filter chamber communicates with another, similar chamber having its own associated U-tube means. Any number of biological filter chambers can in this way be connected "in series" so that the same source of compressed air will actuate all of them.

In the embodiment of the invention illustrated in FIGS. 1–12 water is drawn through the mechanical filter 12 by the action of compressed air which is creating an aim lift and actuating the biological filter 11. Where the embodiment of FIG. 12 is used a mechanical filter for the associated aquarium tank would have independent means for passing tank water through it.

FIG. 14 of the accompanying drawings schematically illustrates an alternative way of drawing water through the mechanical filter and providing air to actuate the biological filter using a single pump, but this time a centrifugal water pump 51. This is positioned on the downstream side of the mechanical filter 12A so that water is drawn through a passage 52 and passed to a first branch 53 of a U-tube arrangement 54 defined by a housing with a closed, rounded end 64 internally divided by a barrier 60 which stops short of the rounded end 64. The interior of the upper end of the branch 53 is restricted at 55 to produce a Venturi and an air inlet 56 opens into branch 53 at the Venturi, so that as water passes down the branch 53 air is entrained in it. The mixture of water and air could be discharged directly to a position in the aquarium tank beneath the biological filter 11A so that air bubbling up from the mixture would actuate the biological filter. However it may be preferred to separate air from the air-and-water mixture in branch 53 and conduct only air to a position beneath the biological filter 11A. As illustrated in FIG. 14 this is achieved by positioning at the distal end of the barrier 60 a C-shaped formation 61 the opening 62 of which is directed away from the mixture flow in branch 53 approximately at "4 o'clock". An air outlet 57 has an opening 63 into the housing of the U-tube arrangement 54 coaxial with the C-formation 61. As the air-and-water mixture passes around the bend defined by end 64 of the housing the water component will travel on the outside of the bend because of its greater density and mainly air will be exposed to the opening 62 of the C-formation and consequently to the opening 63 of the air outlet 57. A slight restriction as at 58 in the other branch 59 of the U-tube 54 will produce a back-pressure sufficient to expell air from the U-tube 54 along the outlet 57 to a position below the biological filter 11A.

It will be apparant that the apparatus of FIG. 14 whereby a single pump produces a flow of both water and air has applications other than to the cycling of the biological filter of the present invention. The apparatus of FIG. 14 could be used simply to circulate water in an aquarium tank at the same time as aerating it, and in this case, if it is not necessary or desired to separate the components of the mixture the bend of the U-tube 54, the asssociated air outlet 57 and the restriction 58 could be dispensed with. Alternatively they may be employed to provide compressed air for a purpose other than to cycle a biological filter in accordance with the present invention.

I claim:

1. A biological filter for an aquarium comprising a closed top biological filter chamber containing a biological filter medium, means for disposing the chamber in or alongside an aquarium tank so that the chamber is substantially below the water level of the tank, means for connecting the bottom region of the chamber to water in the tank, means for introducing air under pressure into the chamber, an outlet connection in the upper region of the chamber and U-tube means comprising two upright branches joined at their bottom ends at or above the level of the bottom of the chamber, one said branch communicating at its upper end with said outlet connection of the chamber and the upper end of the other branch being level with or above said outlet connection, the arrangement being such that in use of the filter air admitted to the chamber displaces water therein until the water level in the chamber reaches the bottom ends of the branches, whereupon residual water in the other branch is expelled to permit evacuation of air from the chamber through the U-tube means with consequent refilling of the chamber and of the branches of the U-tube means with water from the aquarium tank to recommence the cycle.

2. A filter as claimed in claim 1, wherein the chamber is open at its bottom end and wherein the air introduction means is an air outlet disposed below the chamber.

3. A filter as claimed in claim 2 and adapted for submersion in the water in an aquarium tank, wherein said air outlet is arranged also to provide an air lift in the region of the biological filter chamber.

4. A filter as claimed in claim 3, wherein said air outlet is in the form of a horizontally-elongated, hollow member having an array of perforations in its upper surface, and wherein means is provided to vary the position of the hollow member relative to the bottom of the chamber to adjust the ratio of air passing either to the chamber or to the air lift.

5. A filter as claimed in claim 4, wherein said hollow member is mounted eccentrically on the bottom of an upwardly extending hollow shaft, the shaft serving to conduct compressed air to the hollow member and being rotatable to vary the position of the hollow member relative to the bottom of the biological filter chamber.

6. A filter as claimed in claim 3 and comprising a mechanical filter arranged so that in use the air lift will draw aquarium tank water through the mechanical filter.

7. A filter as claimed in claim 6, wherein the mechanical filter comprises a chamber filled with a mechanical filter medium, having openings to admit aquarium tank water in at least one vertical face and communicating at its bottom end with a lower compartment of the filter which communicates also with the air lift and with the bottom end of the biological filter chamber.

8. A filter as claimed in claim 7, and comprising a condition monitor for the mechanical filter in the form of an upright channel which tapers upwardly, the upper end region of the channel having an opening to aquarium water which by-passes the mechanical filter medium and the channel communicating at its bottom end with the said lower compartment, and a buoyant element freely located in the channel and of smaller dimensions than at least the wider part of the channel, the arrangement being such that in use as the mechanical filter medium becomes blocked the flow of aquarium water through the channel will increase, thereby driving the buoyant element downward in the channel to provide a visible indication of the condition of the mechanical filter medium.

9. A filter as claimed in claim 1 and further comprising a silencer chamber located above the biological filter chamber, the silencer chamber communicating with the upper end of the other branch of the U-tube means and having one or more restricted openings at positions which in use will be below the water level of the aquarium tank and having an air outlet in its upper region which in use will be above the water level of the aquarium tank, the arrangement being such that in use of the filter air evacuating the biological filter chamber will displace water from the silencer chamber, thereby reducing the flow rate of air escaping from the silencer chamber to atmosphere.

10. A filter as claimed in claim 1, wherein said means for disposing the biological filter chamber in an aquarium tank comprises one or more suction cups, the or each said cup having in its concave face a central recess for the reception of an adhesive.

11. A filter as claimed in claim 1 and adapted for location outside an aquarium tank, the biological filter chamber having water inlet and outlet means in its lower region adapted for connection to water in an aquarium tank at spaced-apart positions, the water inlet and outlet means being controlled by respective one-way valves to ensure that water flowing into the biological filter chamber as air evacuates therefrom is not substantially the same water as was expelled from the biological filter chamber during the previous cycle.

12. A filter as claimed in claim 1 and comprising a plurality of biological filter chambers each having an associated U-tube means and wherein the arrangement is such that the means for introducing air under pressure into a second said chamber is constituted by the U-tube means associated with a first said chamber, whereby a common means for introducing air under pressure into all of the said chambers is provided by the said means associated with the said first chamber.

13. A biological filter for an aquarium comprising a closed top biological filter chamber containing a biological filter medium, means for disposing the chamber in or alongside an aquarium tank so that the chamber is substantially below the water level of the tank, means for connecting the bottom region of the chamber to water in the tank, a water pump, means on the downstream side of the water pump for entraining air into the pumped water, means for conducting said entrained air into the chamber, an outlet connection in the upper region of the chamber and U-tube means comprising two upright branches joined at their bottom ends at or above the level of the bottom of the chamber, one said branch communicating at its upper end with said outlet connection of the chamber and the upper end of the other branch being level with or above said outlet connection, the arrangement being such that in use of the filter air admitted to the chamber displaces water therein until the water level in the chamber reaches the bottom ends of the branches, whereupon residual water in the other branch is expelled to permit evacuation of air from the chamber through the U-tube means with consequent refilling of the chamber and of the branches of the U-tube means with water from the aquarium tank to recommence the cycle.

14. A filter as claimed in claim 13 and further comprising a mechanical filter, said water pump being arranged to displace aquarium water through the mechanical filter, the pump having on its downstream side an outlet passage in which a Venturi is formed, an air inlet opening to said outlet passage in the region of the Venturi whereby air is entrained in water flowing in said passage.

15. A filter as claimed in claim 14, wherein said outlet passage of the water pump is one branch of a U-tube arrangement having on the inside of the bend therein an opening at one end of an air outlet, the arrangement being such that the mixture of water and air will tend to separate at said bend so that mainly air will be exposed to said opening.

16. A filter as claimed in claim 15, wherein the U-tube arrangement is provided by a housing having a closed, rounded end and an internal barrier which stops short of said rounded end, the barrier having at its end nearer the rounded end of the housing a C-shaped formation opening away from said one branch of the U-tube arrangement and coaxial with an opening of said air outlet into said housing.

17. A filter as claimed in claim 15, wherein the other branch of said U-tube arrangement is provided with a restriction thereby to produce back-pressure in the U-tube which will expell air through the air outlet.

18. A filter as claimed in claim 14, wherein the other end of the air outlet opens to a position beneath an open, bottom end of the biological filter chamber.

\* \* \* \* \*